United States Patent [19]

Middleton

[11] 4,046,627
[45] Sept. 6, 1977

[54] NUCLEAR REACTORS

[75] Inventor: John Ernest Middleton, Knutsford, England

[73] Assignee: Nulcear Power Company (Whetstone) Limited, London, England

[21] Appl. No.: 570,667

[22] Filed: Apr. 23, 1975

[30] Foreign Application Priority Data

Apr. 29, 1974  United Kingdom ............... 18619/74

[51] Int. Cl.² .............................................. G21C 9/00
[52] U.S. Cl. ...................................... 176/38; 176/50; 176/61
[58] Field of Search .................. 176/50, 51, 52, 61, 176/64, 37, 38, 31, 32

[56] References Cited

U.S. PATENT DOCUMENTS

| 3,253,998 | 5/1966 | Hackney | 176/54 |
| 3,346,459 | 10/1967 | Prince et al. | 176/36 |
| 3,379,614 | 4/1968 | Drummond | 176/43 |
| 3,839,150 | 10/1974 | Porter | 176/51 |

FOREIGN PATENT DOCUMENTS

| 790,698 | 7/1968 | Canada | 176/38 |
| 1,272,296 | 4/1972 | United Kingdom | 176/38 |

OTHER PUBLICATIONS

Nucleonics Sept. 1966 "SGHWR: A Dark Horse Competitor" pp. 60-63.

Primary Examiner—Samuel W. Engle
Assistant Examiner—Ralph Palo
Attorney, Agent, or Firm—Kirschstein, Kirschstein, Ottinger & Frank

[57] ABSTRACT

In a nuclear reactor having the fuel disposed within a large number of pressure tubes fed in parallel with liquid coolant which is partly vaporized while flowing through the pressure tubes, the invention provides a coolant-supply header assembly comprising parallel-extending sub-header pipes which at their ends are connected by end pipes and which have water outlets (for connection to the individual pressure tubes) distributed along their lengths, and header pipes each extending transversely across the sub-header pipes at spaced intervals therealong and having a water inlet and a plurality of branch pipes each of which connects to a respective one of the sub-header pipes.

Preferably, a plurality of main coolant circuits are provided, each including such a header assembly, and the fuel in each pressure tube is cooled not only by the main coolant flow from one of the header assemblies but also by spray cooling utilizing coolant drawn from another of the coolant circuits, with each circuit maintaining a balance between coolant received as spray cooling in its own pressure tubes and coolant drawn off for spray cooling of other pressure tubes.

12 Claims, 4 Drawing Figures

NUCLEAR REACTORS

This invention relates to water-cooled nuclear reactors, and particularly, though not exclusively, to a reactor of the kind having a calandria, filled with heavy water which acts as a moderator and formed with calandria tubes which extend vertically through the heavy water, pressure tubes which extend upwardly through the calandria tubes, fuel element assemblies disposed within the pressure tubes, and light water coolant circuits which include the pressure tubes, supplying light water to the lower ends of the pressure tubes and conveying away from the upper ends of the pressure tubes in the form of water and/or steam, the coolant water supplied thereto.

In such a reactor it is known to provide that each coolant circuit comprises a steam drum, to which the upper ends of the pressure tubes of the circuit are connected and in which steam produced by boiling of coolant water in the pressure tubes is separated from such of the water as remains unvaporised, a bottom header to which the lower ends of the pressure tubes are connected, and circulator pumps connected to pump water from the steam drum to the bottom header, the steam drum having a steam outlet connected to supply a steam turbine and a water inlet to which a feedwater pump supplies make-up water (which may in part be re-condensed water from the steam turbine exhaust).

It is important, in such a reactor, to minimise the risk of failure of the supply of coolant water to any of the pressure tubes in the absence of, or even in the period immediately following, reactor shutdown, since such failure results in a temperature rise which might damage the fuel element assemblies and lead to the escape of radio-active material. In the long term, excessive heating of the fuel and its cladding consequent on an incident which damages the installation can be avoided by shutting down the reactor (e.g. by draining the heavy water moderator out of the calandria and/or by allowing or forcing a neutron-absorbent "poison" such as boric acid to fill specially provided liquid shut-down tubes disposed within the calandria); but in the short term, before these shut-down measures can take effect, and to cope with stored heat and delayed neutron heat, it is essential to ensure that, so far as possible, no part of any of the pressure tubes should be deprived of coolant water, either by complete failure of the water supply to a pressure tube or by the onset of a stagnated condition in which the pressures at the inlet and outlet ends of the pressure tube become substantially equal and there is thus no flow of coolant through the pressure tube.

It is an object of the present invention to provide a water-cooled nuclear reactor installation in which the coolant water circuit arrangements are favourably disposed to minimise the risk of the nuclear fuel becoming overheated following the occurrence of an incident which disturbs the normal performance of the cooling circuits.

A basic feature of the present invention, with that object in view, is the provision of a particularly advantageous form of header assembly for distributing the supply of coolant water to the pressure tubes.

According to the invention, therefore, there is provided a nuclear-reactor cooling-water supply header assembly comprising a plurality of sub-header pipes extending generally parallel with one another, each having a first end and a second end and, spaced along its length, a plurality of water outlets for connection each to a respective reactor pressure-tube feed pipe, first and second end pipes connecting the sub-header pipes together at their first and second ends respectively, and a plurality of header pipes extending transversely across the sub-header pipes and spaced from one another longitudinally thereof, each header pipe having a water inlet, for connection to a water pump, and a plurality of branch pipes spaced along its length and connecting it each to a respective one of the sub-header pipes.

In such a header assembly, preferably, each of the sub-header pipes has branch pipes from the respective header pipes spaced regularly along it with at least approximately equal numbers of water outlets disposed between mutually adjacent pairs of the branch pipes.

A nuclear-reactor cooling circuit according to the invention comprises, correspondingly, a cooling-water supply header assembly embodying the invention together with a steam drum having a steam outlet, a plurality of water pumps each connected to draw water from the steam drum and to feed it to the water inlet of a respective one of the header pipes of the assembly, and a plurality of pressure tubes each having a lower end connected to a respective one of the water outlets of the sub-headers of the assembly and an upper end connected to the steam drum.

In such a cooling circuit, the said steam drum may be one of two similar steam drums each having a steam outlet and each connected to supply water to a respective section of the header assembly via a respective plurality of water pumps each connected between a respective one of the steam drums and a respective one of the header-assembly header pipes, those of the pressure tubes which have their lower ends connected to water outlets of a particular section of the header assembly having their upper ends connected to the respective steam drum which supplies water to that particular section.

A nuclear reactor may be provided, according to the invention, with one or a plurality of such cooling circuits, and in the latter case, according to a further feature of the invention, it may be provided that each of the cooling-water circuits is connected to supply an auxiliary coolant-water flow from its steam drum directly to the pressure tubes of another of the cooling-water circuits, in the form of spray-cooling therefor, and to receive as spray cooling in its own pressure tubes a corresponding auxiliary flow from another of the cooling-water circuits. Preferably this crossflow of auxiliary coolant water between circuits is continuously operating and is maintained by positive pumping (with a balance maintained between the water thus received by any one circuit and the water which it similarly supplies to another of the circuits); but it may be found satisfactory not to provide such positive pumping and to rely on the fall in pressure which will occur in a damaged circuit to provide the spray-cooling flow of auxiliary coolant, from another circuit, which in the event of such damage will ensure protection of the pressure tubes in the damaged circuit against overheating.

In one arrangement of a reactor according to the invention, there are four coolant circuits these being connected in pairs at circulator-pump outlet level and each circuit of one such pair having "spray-cooling" cross-connection with one of the circuits of the other pair.

One such embodiment of a water-cooled nuclear reactor installation according to the invention is described below, by way of illustration of the invention, with reference to the accompanying drawings in which.

Figure 1:
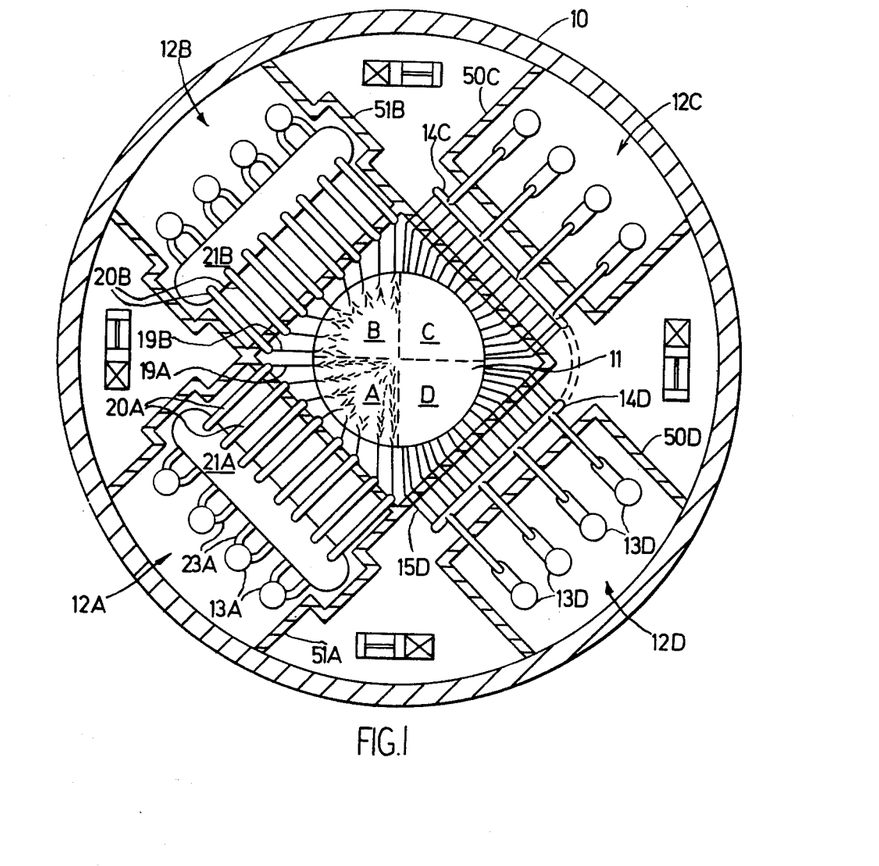
FIG. 1 is a diagrammatic plan view, partly cut away, of a reactor core and four main coolant-water circuits each supplying coolant water to a respective quadrant of the core.

As shown in FIG. 1, a nuclear reactor comprises a containment vessel 10, which is preferably of prestressed concrete and in which is centrally disposed a core 11 of the reactor. The core 11 is of known kind and will not be illustrated or described in detail; it comprises a calandria containing heavy water which serves as the reactor moderator and formed with a large number of vertical calandria tubes, surrounded by the heavy water and open at their upper and lower ends, through which extend pressure tubes in which fuel stringers are disposed and through which coolant water is caused to flow as described below.

Also housed within the vessel 10 are four coolant-water circuits 12A, 12B. 12C and 12D, arranged peripherally round the core 11 and each supplying coolant water to the pressure tubes disposed in a respective quadrant (labelled respectively A,B, C and D) of the core 11. It is not essential to the invention that the pressure tubes served by a particular coolant-water circuit should be thus grouped and segregated in a respective distinct region of the core, but it is a matter of practical convenience in terms of the necessary provision and disposition of piping for the coolant. Preferably, as described below, the coolant-water circuits 12A and 12B are linked together to constitute in effect a single composite circuit serving one half of the reactor core (constituted by the quadrants A and B), the circuits 12C and 12D being similarly linked and similarly serving the other half of the core (quadrants C and D).

Figure 2:
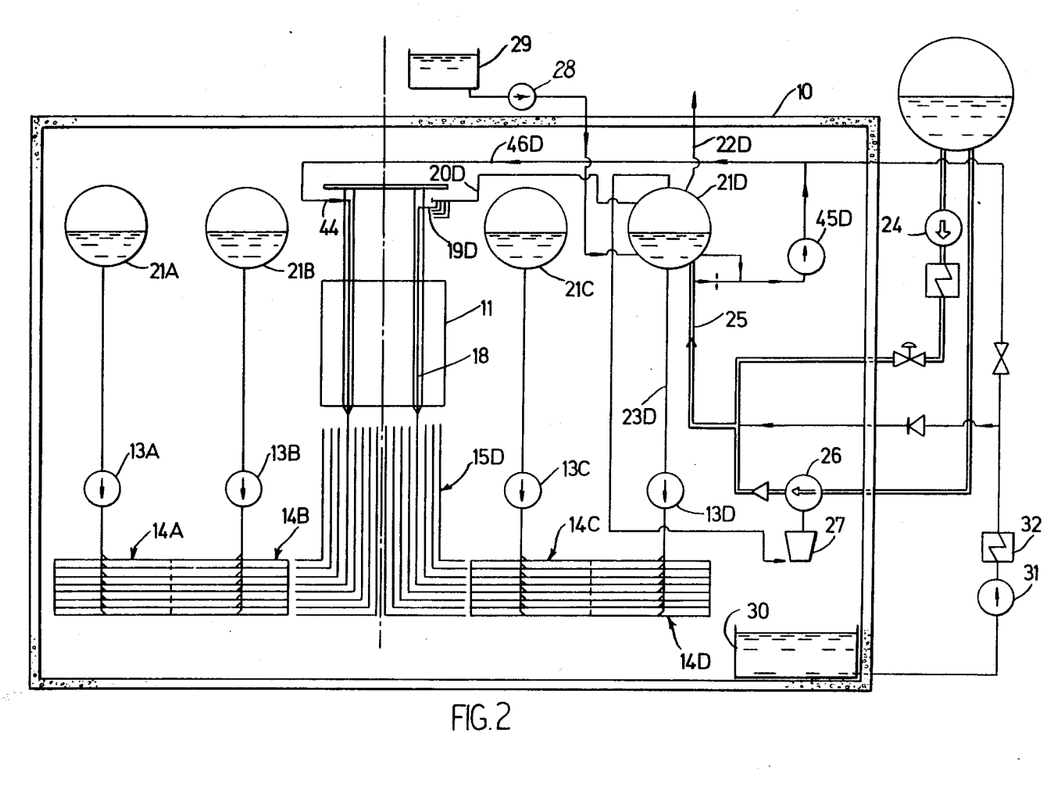
FIG. 2 is a coolant-water circuit diagram of the installation, showing diagrammatically the main coolant-water circuits which are shown in FIG. 1 and also a subsidiary spray-cooling system of the installation.

The four coolant water circuits are of identical design, as now briefly described with reference more particularly to the circuit 12D as shown in FIG. 1 and, schematically, in FIG. 2. The circuit 12D comprises a plurality of coolant circulating pumps 13D (of which there may be four as shown in FIG. 1 but of which only one is represented in FIG. 2) acting in parallel to supply light water to a bottom header assembly 14D which is described in more detail below with reference to FIG. 3 and which supplies a plurality of individual water feed pipes 15D. Each feed pipe 15D is connected to the lower end of a respective pressure tube 18 (see FIGS. 2 and 4) which extends upwardly through a respective calandria tube in the quadrant D of the reactor core 11. Thus all the pressure tubes 18 in the quadrant D are normally supplid with light water, under pressure, from the circulating pumps 13D. As the water flows up the pressure tubes 18, it is heated by nuclear fuel disposed in the pressure tubes and is partially converted into steam. Above the calandria, each pressure tube 18 in the quadrant D is connected to a respective riser pipe 19D and therethrough to one of a plurality of top header pipes 20D which open into a steam drum 21D which thus receives the water and steam from the pressure tubes in the quadrant D. The steam drum 21D, disposed above the bottom header 14D, is not shown in FIG. 1 which does, however, show the corresponding steam drums 21A and 21B of the coolant circuits 12A and 12B respectively, as well as riser pipes 19A and 19B and top header pipes 20A and 20B. In the steam drum 21D the steam and water separate; the steam is led of through a steam outlet 22D to drive a steam turbine of a turbogenerator of the reactor installation, and the water is available for recirculation through downcomers 23D to the inlet sides of the pumps 13D. The water level in the steam drum 21D (and in corresponding steam drums 21A, 21B and 21C of the coolant water circuits 12A. 12B and 12C) is kept substantially constant, make-up water to replace steam supplied to the turbines being supplied from an external source by main feedwater pumps 24, through feed-water inlet pipes 25 which include regulator valves 25' under the control of means which senses the water level in the respective steam drum.

Figure 3:
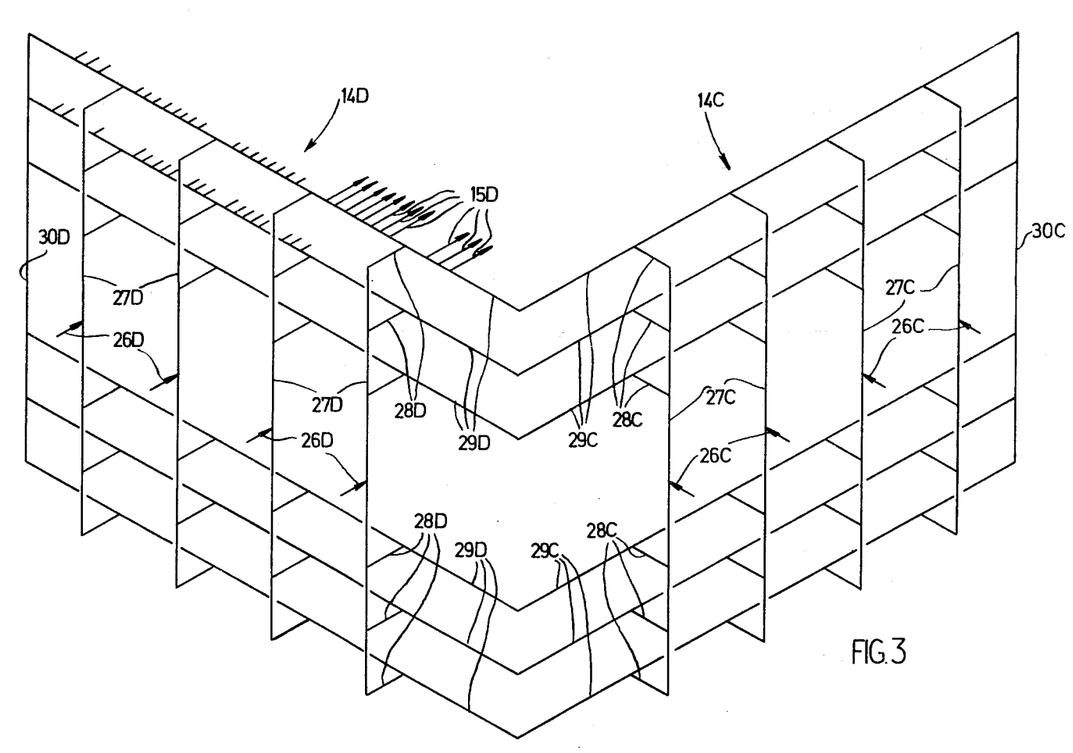
FIG. 3 is a schematic representation of bottom header units of two of the main coolant-water circuits represented in FIGS. 1 and 2, linked together and forming a composite unit.

The bottom header assemblies such as 14D are now described, as shown schematically in FIG. 3 of the drawings. FIG.3 in fact shows both the bottom header assemblies 14C and 14D, and shows them linked together so that the coolant circuits 12C and 12D constitute, in effect, a single composite coolant circuit having a single header assembly of which the circuits 14C and 14D are two equal sections. As shown, four water inlets 26C connected to the outlets of the respective pumps 13C each open into the midpoint of a respective vertical header pipe 27C which communicates through branch pipes 28C with each of a plurality of horizontal sub-header pipes 29C. Thus each sub-header pipe 29C of the header assembly 14C is supplied, through respective branch pipes 28C which are equally spaced along its length, from each of the pumps 13C. The bottom header assembly 14D is similarly composed of water inlets 26D connected to the outlets of the pumps 13D, header pipes 27D with branch pipes 28D, and sub-header pipes 29D. In the illustrated embodiment in which sections 14C and 14D together constitute a single header assembly, each sub-header pipe 29D is connected at one end to an adjacent end of the corresponding sub-header pipe 29C, and the remote ends of the sub-header pipes 29C and 29D are connected together by vertical end pipes 30C and 30D respectively. It will be understood that if the sections 14C and 14D each separately constituted a header assembly according to the invention, the sub-header pipes 29C would be connected not to the pipes 29D but to each other (by another vertical pipe, not shown, provided for the purpose); and the pipes 29D would similarly be connected to each other and not to the pipes 29C. Equally, however, it will be understood that two such separate and distinct bottom header assemblies could, if desired, also be connected together by additional pipework.

As shown in respect of the uppermost of the sub-header pipes 29D, each of the sub-header pips 29C and 29D is formed with a substantial number of water outlets which are connected to the individual feed pipes 15C and 15D respectively, of which there may be, say, eight between two mutually adjacent branch pipes 28C or 28D. It will be seen that the arrangement of the various pipes is regular, and that if all the eight pumps 13C etc., and 13D, etc., are supplying water at equal rates, and if all the individual feed pipes 15C and 15D receive equal flows of water, each branch pipe 28C or 28D will carry the same flow and will supply the four individual feed pipes on each side of it. There will be no flow from any of the pipes 29C to the pipe 29D to which it is connected or vice versa, nor in the end pipes 30C and 30D. Preferably, the bores of the various pipes are selected as appropriate to this steady-flow condition, except that the pipes 30C and 30D have the same bore as the pipes 29C and 29D. Thus each sub-header pipe 29D has a bore appropriate to a flow four times as great as in each individual feed pipe 15D, and each branch pipe 28D has a bore appropriate to a flow twice as great as that in each sub-header pipe 29D, and so on.

The above-described construction of the coolant circuits and of the bottom header assemblies incorporated therein is well adapted to minimise the undesired effects of various types of circuit failure. Thus, if one of the pumps 13C should fail, or if it or is outlet 26C should fracture so that water escapes from the circuit, the feed-pipes 15C normally supplied from that pump will continue to receive water from the adjacent pumps in the same circuit and/or (through the inerconnecting pipes) from the pumps in the circuit 12D. Similarly a fracture and consequent loss of water at any point of one of the header pipes 27C, branch pipes 28C or sub-header pipes 29C will be largely compensated for by an altered flow pattern in the remainder of the circuit. Even in the event of a failure of one of the two steam drums 21C and 21D, which could deprive the pumps 13C or 13D, respectively, of their water supply, the remaining set of pumps 13D or 13C, respectively, would supply at least a reduced flow of water to all the individual feeder piper 15C and 15D. Preferably, to minimise the loss of pumped water and consequently the increase in the loading on the remaining effective pumps, following a breach in a steam drum or in a pump, each pump outlet such as 26C or 26D incorporates (though not so shown in the drawings) a non-return valve and/or a "fluid diode" of known kind which presents substantially different values of resistance to flow through it in the forward and backward directions.

Referring again to FIG. 2, each coolant circuit, supplied by a respective main feedwater pump 24 which is conveniently electrically driven from a mains electrical supply, is preferably provided with an ancillary feedwater pump 26 driven, when operative, by a steam turbine 27 which is powered by steam supplied from the steam drum of the coolant circuit in question. Thus, as shown, the turbine 27 for the coolant circuit which includes the steam drum 21D is supplied when operative with steam from that steam drum and can take over the duty of the pump 24 in the event of a mains electrical failure. Alternatively, that turbine 27 may be driven by steam from the steam drum 21C, the steam from steam drum 21D being available to the corresponding turbine for the coolant circuit 12C; or, as another alternative, steam from both these steam drums may be made available independently to both these turbines 27. As a further safeguard, each coolant water circuit is provided with a guaranteed feedwater supply by means of a respective pump 28 drawing water from a reservoir tank 29.

In the event of a serious failure in the reactor, the reactor world, of course, be shut down as rapidly as possible; but there would be a continuing need to maintain a flow of coolant water through the reactor core. Such a failure might well result in breaches in the coolant water circuits and consequent coolant water leakage therefrom, and the water thus lost would collect in a sump pond 30 within the containment vessel 10. To enable this "lose" watter to be re-used, there are provided further pumps 31 connected to pump water from the sump pond 30 back into each of the four coolant circuits. Since these pumps 31 and the water flow through them may be an integral and essential part of the long-term coolant-circulation pattern which must be relied on to provide continuous cooling of the shut-down reactor core after a serious reactor failure, each pump 31 has associated with it a water cooler 32 for dissipating effectively the residual thermal power output of the reactor core in those conditions.

As already explained, the design of the bottom header assemblies such as 14D, and the fact of their being linked together in pairs (such as 14C and 14D) virtually ensures that an adequate supply of coolant water will be maintained to all parts of the half of the reactor core supplied by such a pair, even in the event of such a serious failure as a breach in one of the two steam drums associated with that pair. There remains a possibility, though it is extremely remote, that both steam drums of a pair of linked coolant circuits (for example, both the steam drums 21A and 21B) might simultaneously be seriously breached and that all of the pumps 13A and 13B drawing water therefrom would be deprived of their water supply. In such an event, half the reactor core would be deprived of coolant water, were it not that alternative provision is made to cope with even this remote eventuality, as will be described below.

Figure 4:
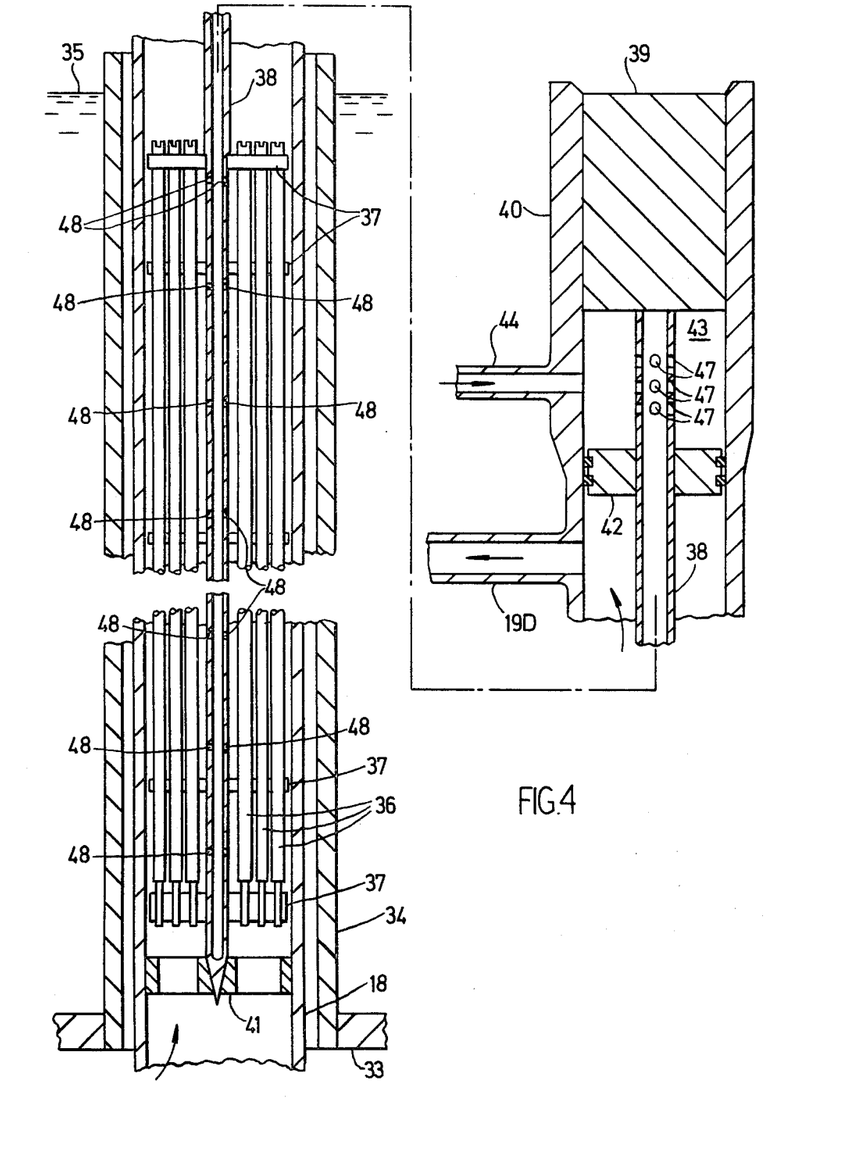
FIG. 4 is a vertical cross-sectional view of one of many fuel channels within the core of the reactor.

FIG. 4 shows, in some detail, one of the pressure tubes 18 in relation to the fuel element assembly disposed within it and the core calandria through which it extends. the calandria comprises a base plate 33, a surrounding wall (not shown) and a large number of calandria tubes 34 (of which one is shown) each of which is open at its upper and lower ends and at its lower end seals an aperture in the base plate 33. The calandria is filled to a level 35 with heavy water which tus surrounds the calandria tubes, whose upper ends are above the level 35, and each calandria tube 34 accommodates one of the pressure tubes 18 already referred to. Within each pressure tube 18 is a respective fuel assembly, comprising fuel pins 36 spaced apart by spacers 37 and suspended by a support rod 38 from a seal plug 39 inserted into the upper end of a standpipe 40 which is sealed to the pressure tube 18 and forms an upward extension thereof. The fuel assembly and seal plug are removable from the pressure tube 28 and standpipe 40 by withdrawing them upwardly. The lower end of the support rod 38 is formed as a locating spike which, when fully lowered, engages in locating means 41 secured in the pressure tube 18 near the level of the calandria base plate 33. Light water coolant flows upwardly through the pressure tube 18 (and through apertures in the locating means 41) and is partially converted to steam as it flows upwards in contact with the fuel pins 36. The resulting water-steam mixture flows laterally out of the standpipe 40 through a respective one of the riser pipes 19D (assuming the pressure tube 18 is one of those located in quadrant D of the core and supplied with coolant water via one of the feed pipes 15D) and thence through one of the top header pipes 20D to the steam drum 21D. Above the level at which the riser pipe 19B opens laterally from the standpipe 40, the support rod 38 is fitted with a sealing piston 42 which isolates a chamber 43 in the standpipe 40, immediately below the seal plug 39; and opening laterally into the chamber 43 is a pipe 44, for a purpose now to be described.

As described above, there is only a very small risk that a failure in any of the coolant circuits (so far as already described above) will result in one or two of the quadrants of the core being deprived of coolant water or even that such a failure could result in a rapid onset of stagnation in even only one or a few of the pressure tubes 18. It is, nevertheless, a risk which must be taken into account; and to this end, according to the invention, the coolant circuits which supply coolant water to the pressure tubes 18 in either half of the reactor core are made also to provide a relatively small, but continuous, supply of coolant water also to the pressure tubes 18 in the respective other half of the reactor core. For this purpose, a continuously operating high-pressure pump 45D is connected to draw water from the steam drum 21D and feed it through one or more feed pipes 46D to all those pressure tubes 18 which are disposed in one of the core quadrants A and B (the pressure tubes 18 in the other of these two quadrants being similarly supplied from the steam drum 21C); and similarly, each of the steam drums 21A and 21B provides, through a respective pump corresponding to the pump 45D) a supply of coolant water to each of the pressure tubes 18 in a respective one of the core quadrants C and D. Thus the pressure tube 18 of FIG. 4 (assumed to be in quadrant D of the core) receives a supply of coolant water from one of the steam drums 21A amnd 21B. The water thus supplied is fed through the pipe 44 into the chamber 43 of the pressure tube 18. The support rod 38 is formed as a tube, with apertures 47 through which its interior is in communication with the chamber 40; and it is also formed with spray orifices 48, distributed along that part of its length which is surrounded by the fuel pins 36.

The pump 45D and the other corresponding pumps operate continuously and thus each pressure tube 28 in any quadrant of the reactor core receives not only its principal supply of light water coolant at its lower end but also a supplementary supply, derived from the coolant circuit which provides the principal supply to tubes 18 in another quadrant, through its respective support rod 38 and the spray orifices 48 therein. In normal operation of the reactor, the proportion of coolant supplied to each pressure tube 18 through the support rod 38 may be some 4% to 6%, or more if desired, of the total coolant supply to that pressure tube. In the event of a total failure of the principal coolant supply to a particular pressure tube, or a partial failure such that all the coolant thus supplied boils before it reaches the upper part of the fuel assembly, the supplementary supply through the support rod 38 is sufficient to ensure that water in the liquid phase is supplied to the fuel assembly over the whole length thereof so that serious rapid overheating of any part of the fuel assembly is prevented. It will be understood that this provision of a spray cooling water supply is redundant during normal operation of the reactor, but that the fact that it is continuously operative means that, in the event of a reactor failure, the spray cooling supply which might then be vital is already operative and does not have to be initiated (by means of valves and other control devices which, since they would be so rarely called into action, might prove unreliable at the very moment when their proper operation is essential). In other words, the provision of a continuously operating spray-cooling water supply is much to be preferred, from the point of view of reliability; and the fact that the coolant circuits are cross-connected, so that each provides this supply for another, greatly simplifies the control of the total rate of supply of water to the coolant circuits under varying power-output settings of the reactor. In particular, the spray-cooling water supply to each circuit can be maintained at any desired level even when the reactor is operating under very light loading, without fear that this will result in flooding of the reactor due to the total rate of coolant water supply exceeding the rate at which coolant water is being converted into steam.

It will be observed that each of the coolant circuits comprises one part, in and in the vicinity of the reactor core, where its components are essentially of relatively small cross-section and another part, including the steam drum and the circulating pumps, in which the component cross-sections are essentially much larger. As may be seen from FIG. 1, the components of essentially large cross-section are isolated, within the containment vessel 10, by protective barriers such as barriers 50C and 50D which enclose the circulating pumps of the circuits 12C and 12D respectively and barriers 51A and 51B which enclose the steam drums 21A and 21B respectively. Preferably, within each circuit the steam drum is similarly isolated from the circulating pumps, though that is not shown in FIG. 1. These protective barriers are intended to prevent the propagation of damage from one coolant circuit to another, or from one to another part of a single coolant circuit, in the event of a breach occurring in a part of a coolant circuit where the cross-sections are large and the destructive forces which could be generated are potentially large. In the parts of the circuits where the cross-sections and thus the possible seriousness of a single breach are essentially smaller, notably in the bottom headers and the individual feed pipes 15, the potential for breach propagation is preferably minimised by providing individual pipes with crack arresters in known manner and by providing adequate supports and anchorage for such pipes to prevent them for flailing and damaging adjacent pipes.

The interconnection of each coolant circuit with another, from the bottom header assembly of the one to the bottom header assembly of the other, is such that, if one of the two interconnected circuits is breached, normal coolant flow (though perhaps somewhat reduced in amount) is maintained in the other, whilst in the breached circuit coolant flow through the pressure tubes will continue in the normal direction in all except, perhaps, those pressure tubes whose feedpipes 15 are fed from a point on the bottom header assembly immediately adjacent a breach occurring therein; and in most of those pressure tubes there will occur a reverse flow or "blowdown" of coolant, so that actual stagnation can occur in only a very few of the pressure tubes. Furthermore, the circuit arrangement limits the rate of decompression which can occur in the circuit following even the most serious breach which can occur in it, and this relatively slow loss of pressure means that, in those few pressure tubes in which stagnation may occur, there is a minimal fall-off in the heat transfer rates applicable to the spray cooling provided in those channels.

In addition, since stagnation in a pressure tube is a consequence of equality of the pressures at the inlet and outlet ends of the tube, a subsequent change of pressure at either end of a stagnated tube such as in induced on run-down of the circulator pumps of the circuit containing the tube, or as two interconnected circuits depressurise at different rates, prevents the occurrence of stable stagnation since the change of pressure induces a forward or (in the case of pump run-down) a reverse flow of coolant through the pressure tube to cool the fuel.

I claim:

1. A nuclear-reactor cooling-water supply header assembly comprising
   a plurality of sub-header pipes extending generally parallel with one another, each having a first end and a second end and, spaced along its length, a plurality of water outlets for connection each to a respective reactor pressure-tube feed pipe,
   first and second end pipes connecting the sub-header pipes together at their first and second ends respectively, and
   a plurality of header pipes extending transversely across the sub-header pipes and spaced from one another longitudinally thereof, each header pipe having a water inlet, for connection to a water pump, and a plurality of branch pipes spaced along its length and connecting it each to a respective one of the sub-header pipes.

2. A header assembly as claimed in claim 1, wherein each of the subheader pipes has branch pipes from the respective header pipes spaced regularly along it with at least approximately equal numbers of water outlets disposed between mutually adjacent pairs of the branch pipes.

3. A nuclear-reactor cooling circuit comprising
   a cooling-water supply header assembly as claimed in claim 1,
   a steam drum having a steam outlet,
   a plurality of water pumps each connected to draw water from the steam drum and to feed it to the water inlet of a respective one of the header pipes of the assembly, and
   a plurality of pressure tubes each having a lower end connected to a respective one of the water outlets of the subheaders of the assembly and an upper end connected to the steam drum.

4. A cooling circuit as claimed in claim 3, having four of the said water pumps connected to draw water from the said steam drum and each connected to feed water to a respective one of four header pipes of the said header assembly.

5. A nuclear reactor comprising a reactor core and a cooling-water circuit as claimed in claim 3 with the pressure tubes thereof extending upwardly through the core.

6. A nuclear reactor comprising a reactor core and a plurality of cooling-water circuits each as claimed in claim 3, with the pressure tubes of each of the circuits extending upwardly through the core.

7. A nuclear reactor as claimed in claim 6, wherein the header assemblies of the respective cooling-water circuits are disposed peripherally round the reactor core and each of the header assemblies is connected to another which is adjacent to it in the peripheral direction.

8. A nuclear reactor as claimed in claim 7, wherein each of the cooling-water circuits is connected to supply an auxiliary coolant-water flow from its steam drum directly to the pressure tubes of another of the cooling-water circuits, in the form of spray-cooling thereform and to receive as spray cooling in is own pressure tubes a corresponding auxiliary flow from another of the cooling-water circuits 9. A nuclear-reactor cooling circuit as claimed in claim 3, wherein the steam drum is one of two similar steam drums each having a steam outlet and each connected to supply water to a respective section of the header assembly via a respective plurality of water pumps each connected between a respective one of the steam drums and a respective one of the header-assembly header pipes, those of the pressure tubes which have their lower ends connected to water outlets of a particlar section of the header assembly having their upper ends connected to the respective steam drum which supplies water to that particular section.

10. A nuclear reactor comprising a reactor core and a cooling-water circuit as claimed in claim 9, with the pressure tubes thereof extending upwardly through the core.

11. A nuclear reactor comprising a reactor core and a plurality of cooling-water circuits each as claimed in claim 9, with the pressure tubes of each of the circuits extending upwardly through the core.

12. A nuclear reactor as claimed in claim 11, wherein each steam drum of one of the cooling circuits is connected to supply an auxiliary coolant-water flow directly to the pressure tubes connected to one section of the header assembly of another of the cooling circuits, in the form of spray cooling for those pressure tubes, and the pressure tubes connected to water outlets of respective sections of the said one header assembly are connected to receive, as spray cooling, a corresponding auxiliary flow from respective steam drums of another of the cooling circuits.

* * * * *

UNITED STATES PATENT AND TRADEMARK OFFICE
CERTIFICATE OF CORRECTION

PATENT NO. : 4,046,627
DATED : September 6, 1977
INVENTOR(S) : JOHN ERNEST MIDDLETON It is certified that error appears in the above-identified patent and that said Letters Patent are hereby corrected as shown below:

In the title page, change item [73] to read:

NUCLEAR POWER COMPANY LIMITED, LONDON, ENGLAND.

Signed and Sealed this

Sixteenth Day of May 1978

[SEAL]

Attest:

RUTH C. MASON
Attesting Officer

LUTRELLE F. PARKER
Acting Commissioner of Patents and Trademarks